(12) United States Patent
Breed et al.

(10) Patent No.: US 7,253,725 B2
(45) Date of Patent: Aug. 7, 2007

(54) APPARATUS AND METHOD FOR BOOSTING SIGNALS FROM A SIGNAL-GENERATING OR MODIFYING DEVICE

(75) Inventors: David S. Breed, Boonton Township, Morris County, NJ (US); Wendell C. Johnson, Signal Hill, CA (US); Wilbur E. DuVall, Kimberling City, MO (US)

(73) Assignee: Automotive Technologies International, Inc., Denville, NJ (US)

( * ) Notice: Subject to any disclaimer, the term of this patent is extended or adjusted under 35 U.S.C. 154(b) by 512 days.

(21) Appl. No.: 10/642,028

(22) Filed: Aug. 15, 2003

(65) Prior Publication Data

US 2004/0066287 A1    Apr. 8, 2004

Related U.S. Application Data

(60) Provisional application No. 60/415,862, filed on Oct. 3, 2002.

(51) Int. Cl.
*B60C 23/00* (2006.01)

(52) U.S. Cl. ............. 340/447; 340/442; 340/443; 73/146.2; 73/146.8

(58) Field of Classification Search .......... 340/442, 340/443, 447; 73/146.2, 146.8
See application file for complete search history.

(56) References Cited

U.S. PATENT DOCUMENTS

| | | | | |
|---|---|---|---|---|
| 4,746,830 A | | 5/1988 | Holland | |
| 4,994,798 A | * | 2/1991 | McColl | 333/195 |
| 5,289,160 A | * | 2/1994 | Fiorletta | 340/447 |
| 5,838,229 A | * | 11/1998 | Robinson, III | 340/442 |
| 5,973,636 A | | 10/1999 | Okubo et al. | |
| 5,995,019 A | | 11/1999 | Chieu et al. | |
| 6,107,910 A | | 8/2000 | Nysen | |
| 6,639,509 B1 | | 10/2003 | Martinez | |
| 6,662,642 B2 | * | 12/2003 | Breed et al. | 73/146 |
| 6,758,089 B2 | * | 7/2004 | Breed et al. | 73/146 |
| 6,876,265 B2 | * | 4/2005 | Nantz et al. | 331/107 R |

OTHER PUBLICATIONS

Low Frequency Circulator/Isolator Uses No Ferrite or Magnet, Charles Wenzel, 1991.

* cited by examiner

*Primary Examiner*—Daryl C Pope
(74) *Attorney, Agent, or Firm*—Brian Roffe

(57) ABSTRACT

Arrangement for providing a boosted signal from a signal-generating device, such as a SAW device or an RFID tag, including an antenna and a circulator having a first port connected to the antenna to receive a signal therefrom and a second port connectable to the device to provide a signal thereto and receive a signal therefrom. The circulator amplifies the signal from the antenna and the signal received from the device such that a twice-amplified signal is directed to the antenna. A receiving and processing module transmits a signal to the antenna causing the antenna to generate its signal and receive a signal from the antenna derived from the twice-amplified signal. Various pumping systems for vehicle tires and electricity generating systems which generate energy upon rotation of a tire are also disclosed.

31 Claims, 12 Drawing Sheets

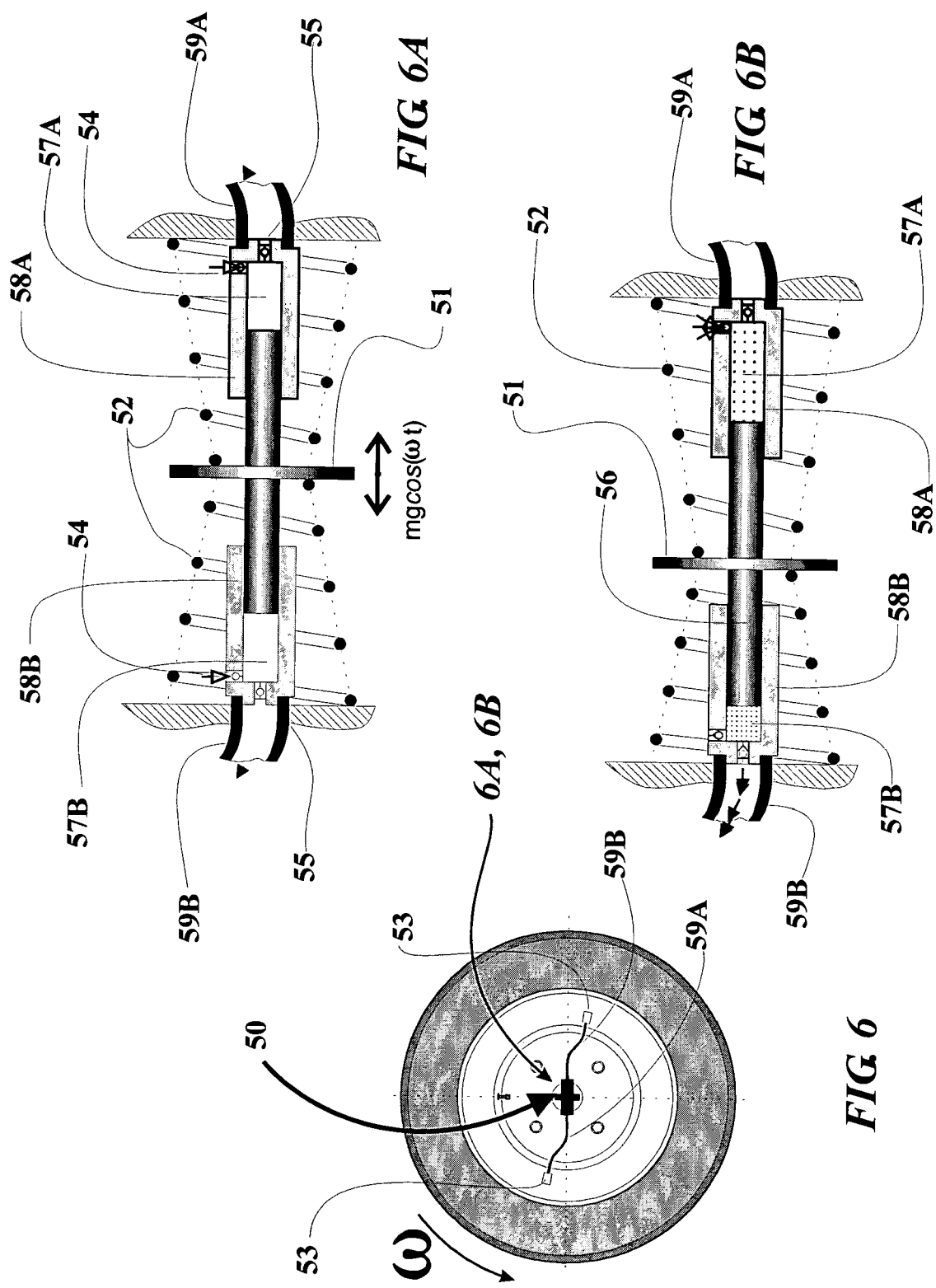

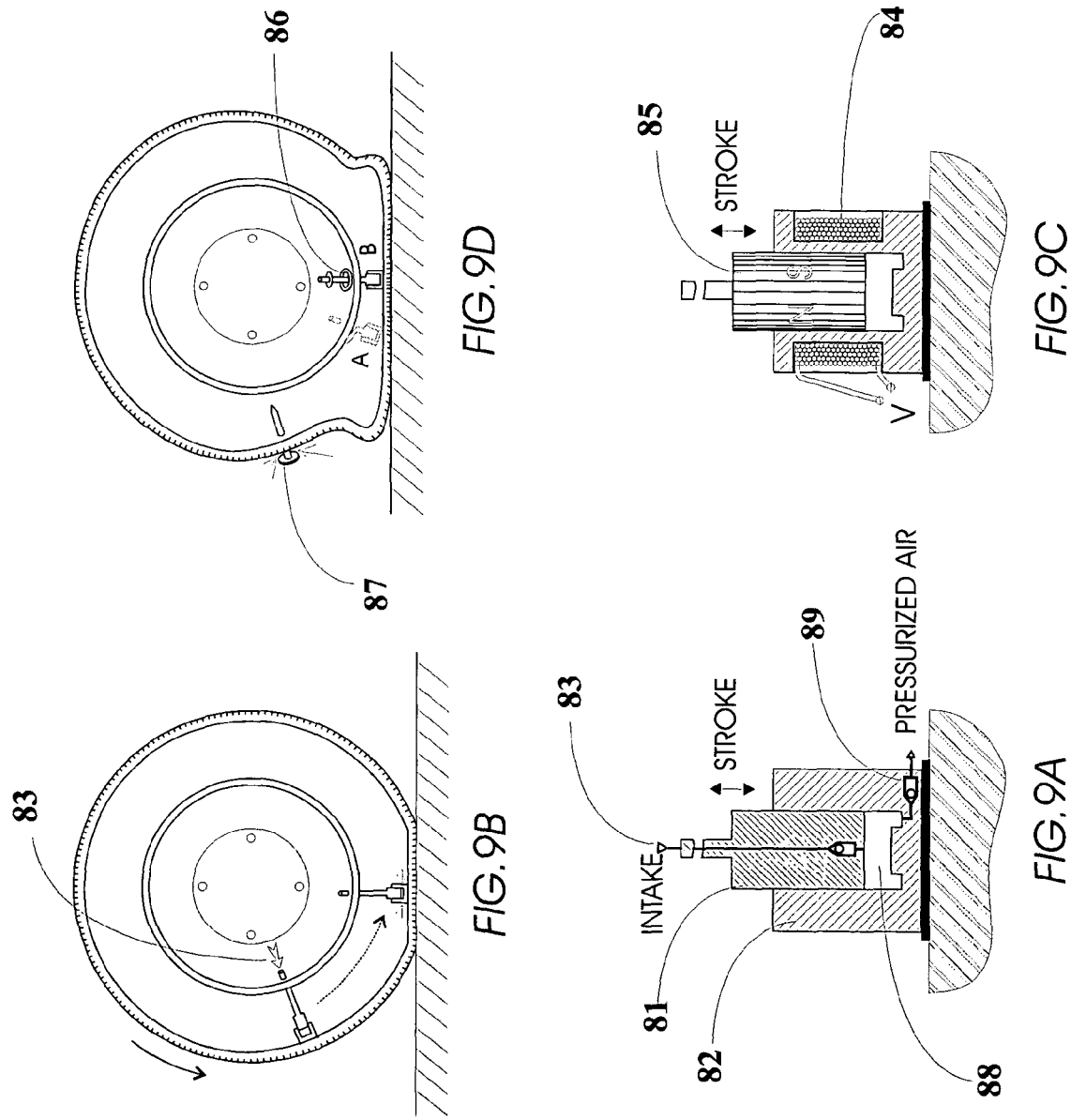

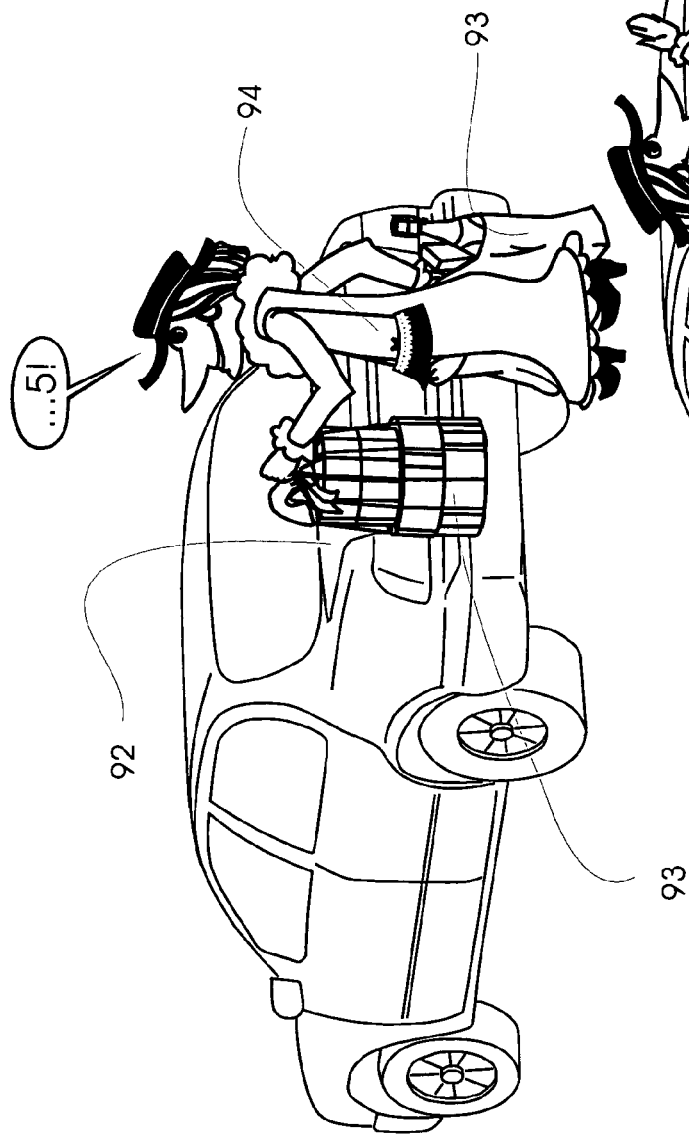
FIG. 10A
FIG. 10B

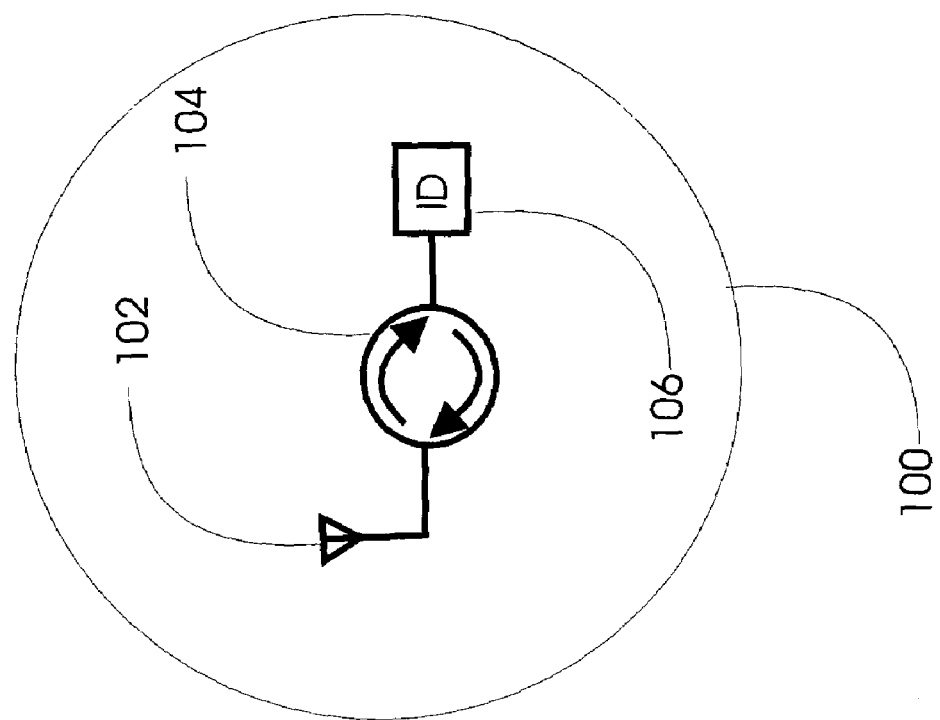
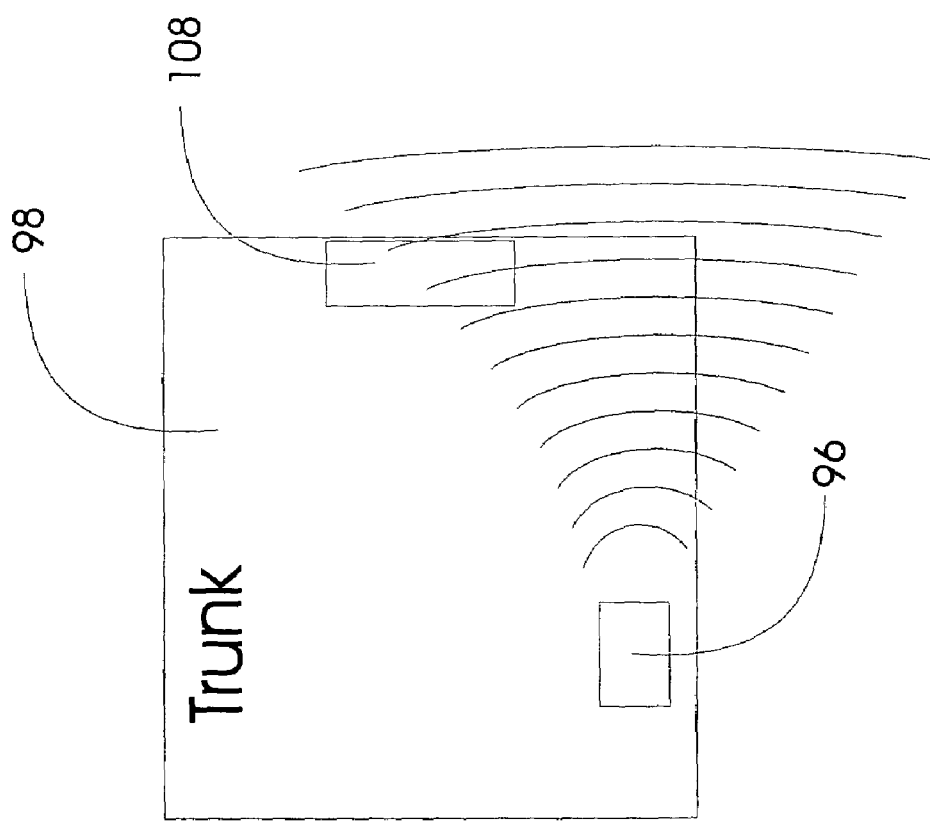
FIG. 10C

APPARATUS AND METHOD FOR BOOSTING SIGNALS FROM A SIGNAL-GENERATING OR MODIFYING DEVICE

CROSS REFERENCE TO RELATED APPLICATION

This application claims priority under 35 U.S.C. §119(e) of U.S. provisional patent application Ser. No. 60/415,862 filed Oct. 3, 2002, the entire contents of which are incorporated by reference herein.

FIELD OF THE INVENTION

The present invention relates to apparatus and methods for boosting signals to signal-receiving and signal-activated sensors and other devices, and boosting signals from signal-generating sensors and other devices.

More particularly, the present invention relates to apparatus and method for boosting signals to and from surface-acoustic-wave (SAW) devices and passive radio-frequency identification (RFID) tags. The present invention also relates to boosting signals to and/or from radar antennas that backscatter energy based on the resonance.

In general, the signal-boosting apparatus and methods can be used in whatever applications the sensors or radar antennas are used, including but not limited to vehicular applications.

The present invention also relates to apparatus and methods for boosting signals in which the energy for boosting the signals is provided by the environment such as by motion, such as motion of a vehicle when the signal-generating or receiving device is arranged on a vehicle.

The present invention also relates to tires including a pumping systems or an electricity generating system.

BACKGROUND OF THE INVENTION

The invention is related to the monitoring of vehicular components, systems and subsystems as well as to the measurement of physical and chemical characteristics relating to the vehicle or its components, systems and subsystems and using the measurements to control and/or affect one or more vehicular systems. Some of the systems which are monitored can include the tires. As generally used herein, a tire is made of a rubber substrate defining side walls and a tread. The tire is mounted on a wheel rim so that a wheel as generally used herein, includes a tire and a wheel rim.

Tire monitoring is now extremely important since NHTSA (National Highway Traffic Safety Administration) has recently linked 148 deaths and more than 525 injuries in the United States to separations, blowouts and other tread problems in Firestone's ATX, ATX II and Wilderness AT tires, 5 million of which were recalled in 2000. Many of the tires were standard equipment on the Ford Explorer. Ford recommends that the Firestone tires on the Explorer sport utility vehicle be inflated to 26 psi, while Firestone recommends 30 psi. It is surprising that a tire can go from a safe condition to an unsafe condition based on an under inflation of 4 psi as suggested by Firestone.

According to a NHTSA research survey, 27% of passenger cars on U.S. roadways are driven with one or more substantially under-inflated tires. In addition, the survey found that 33% of light trucks (including sport utility vehicles, vans and pickup trucks) are driven with one or more substantially under-inflated tires.

Recent studies in the United States conducted by the Society of Automotive Engineers show that low tire pressure causes about 260,000 accidents annually. Another finding is that about 75% of tire failures each year are preceded by slow air leaks or inadequate tire inflation. Nissan, for example, warns that incorrect tire pressures can compromise the stability and overall handling of a vehicle and can contribute to an accident. Additionally, most non-crash auto fatalities occur while drivers are changing flat tires. Thus, tire failures are clearly a serious automobile safety problem that requires a solution.

About 16% of all car accidents are a result of incorrect tire pressure. Thus, effective pressure and wear monitoring is extremely important. Motor Trend magazine stated that one of the most overlooked maintenance areas on a car is tire pressure. An estimated 40% to 80% of all vehicles on the road are operating with under-inflated tires. When under-inflated, a tire tends to flex its sidewall more, increasing its rolling resistance which decreases fuel economy. The extra flex also can create excessive heat in the tire that can shorten its service life.

The Society of Automotive Engineers reports that about 87% of all flat tires have a history of under-inflation. About 85% of pressure loss incidents are slow punctures caused either by small-diameter objects trapped in the tire or by larger diameter nails. The leak will be minor as long as the nail is trapped. If the nail comes out, pressure can decrease rapidly. Incidents of sudden pressure loss are potentially the most dangerous for drivers and account for about 15% of all cases.

A properly inflated tire loses approximately 1 psi per month. A defective or worn tire can lose pressure at a more rapid rate. About 35% of the recalled Bridgestone tires had improper repairs.

Research from a variety of sources suggests that under-inflation can be significant to both fuel economy and tire life. Industry experts have determined that tires under-inflated by a mere 10% wear out about 15% faster. An average driver with an average set of tires can drive an extra 5,000 to 7,000 miles before buying new tires by keeping the tire properly inflated.

The American Automobile Association has determined that under-inflated tires cut a vehicle's fuel economy by as much as 2% per psi below the recommended level. If each of a car's tires is supposed to have a pressure of 30 psi and instead has a pressure of 25 psi, the car's fuel efficiency drops by about 10%. Depending on the vehicle and miles driven, that could cost the owner from $100 to $500 a year.

The ability to control a vehicle is strongly influenced by tire pressure. When the tire pressure is kept at proper levels, optimum vehicle braking, steering, handling and stability are accomplished. Low tire pressure can also lead to damage to both the tires and wheels.

A Michelin study revealed that the average driver does not recognize a low tire until it is 14 psi too low. One of the reasons is that today's radial tire is hard to judge visually because the sidewall flexes even when properly inflated.

Despite all the recent press about keeping tires properly inflated, new research shows that most drivers do not know the correct inflation pressure. In a recent survey, only 45% of respondents knew where to look to find the correct pressure, even though 78% thought they knew. Twenty-seven percent incorrectly believed the sidewall of the tire carries the correct information and did not know that the sidewall only indicates the maximum pressure for the tire, not the optimum pressure for the vehicle. In another survey, about 60% of the respondents reported that they check tire pressure but only before going on a long trip. The National Highway Traffic Safety Administration estimates that at least one out of every five tires is not properly inflated.

The problem is exacerbated with the new run-flat tires where a driver may not be aware that a tire is flat until it is destroyed. Run-flat tires can be operated at air pressures below normal for a limited distance and at a restricted speed (e.g., 125 miles at a maximum of 55 mph). The driver must therefore be warned of changes in the condition of the tires so that she can adapt her driving to the changed conditions.

One solution to this problem is to continuously monitor the pressure and perhaps the temperature in the tire. Pressure loss can be automatically detected in two ways: by directly measuring air pressure within the tire or by indirect tire rotation methods. Various indirect methods are based on the number of revolutions each tire makes over an extended period of time through the ABS system and others are based on monitoring the frequency changes in the sound emitted by the tire. In the direct detection case, a sensor is mounted into each wheel or tire assembly, each with its own identity. An on-board computer collects the signals, processes and displays the data and triggers a warning signal in the case of pressure loss.

Under-inflation is not the only cause of sudden tire failure. A variety of mechanical problems including a bad wheel bearing or a "dragging" brake can cause the tire to heat up and fail. In addition, as may have been a contributing factor in the Firestone case, substandard materials can lead to intra-tire friction and a buildup of heat. The use of re-capped or over-loaded truck tires is another example of heat caused failure as a result of intra-tire friction. An overheated tire can fail suddenly without warning.

As discussed in more detail below, direct tire monitors permit the driver to check the vehicle tire pressures from inside the vehicle.

The *Transportation Recall Enhancement, Accountability and Documentation Act*, (H.R. 5164, or Public Law No. 106-414) known as the TREAD Act, was signed by President Clinton on Nov. 1, 2000. Section 12, TIRE PRESSURE WARNING, states that: "Not later than one year after the date of enactment of this Act, the Secretary of Transportation, acting through the National Highway Traffic Safety Administration, shall complete a rulemaking for a regulation to require a warning system in a motor vehicle to indicate to the operator when a tire is significantly under-inflated. Such requirement shall become effective not later than 2 years after the date of the completion of such rulemaking." Thus, it is expected that a rule requiring continuous tire monitoring will take effect for the 2004 model year.

This law will dominate the first generation of such systems as automobile manufacturers move to satisfy the requirement. In subsequent years, more sophisticated systems will be developed that in addition to pressure, will monitor temperature, tire footprint, wear, vibration, etc. Although TREAD requires that the tire pressure be monitored, it is believed by the inventors that other parameters are as important as the tire pressure or even more important than the tire pressure as described in more detail below.

Consumers are also in favor of tire monitors. Johnson Controls' market research showed that about 80% of consumers believe a low tire pressure warning system is an important or extremely important vehicle feature. Thus, as with other safety products such as airbags, competition to meet customer demands will soon drive this market.

Although, as with most other safety products, the initial introductions will be in the United States, speed limits in the United States and Canada are sufficiently low that tire pressure is not as critical an issue as in Europe, for example, where the drivers often drive much faster.

The advent of microelectromechanical (MEMS) pressure sensors, especially those based on surface acoustical wave (SAW) technology, has now made the wireless and powerless monitoring of tire pressure feasible. This is the basis of some of the tire pressure monitors described below. According to a Frost and Sullivan report on the U.S. Micromechanical Systems (MEMS) market (June 1997): "A MEMS tire pressure sensor represents one of the most profound opportunities for MEMS in the automotive sector."

There are many wireless tire temperature and pressure monitoring systems disclosed in the prior art patents such as for example, U.S. Pat. Nos. 4,295,102, 4,296,347, 4,317,372, 4,534,223, 5,289,160, 5,612,671, 5,661,651, 5,853,020 and 5,987,980 and International Publication No. WO 01/07271(A1), all of which are illustrative of the state of the art of tire monitoring and are incorporated by reference herein.

Devices for measuring the pressure and/or temperature within a vehicle tire directly can be categorized as those containing electronic circuits and a power supply within the tire, those which contain electronic circuits and derive the power to operate these circuits either inductively, from a generator or through radio frequency radiation, and those that do not contain electronic circuits and receive their operating power only from received radio frequency radiation. For the reasons discussed above, the discussion herein is mainly concerned with the latter category. This category contains devices that operate on the principles of surface acoustic waves (SAW) and the disclosure below is concerned primarily with such SAW devices although in some cases RFID devices are also used.

International Publication No. WO 01/07271 describes a tire pressure sensor that replaces the valve and valve stem in a tire.

U.S. Pat. No. 5,231,827 contains a basic description and background of the tire-monitoring problem. The device disclosed, however, contains a battery and electronics and is not a SAW device. Similarly, the device described in U.S. Pat. No. 5,285,189 contains a battery as do the devices described in U.S. Pat. Nos. 5,335,540 and 5,559,484. U.S. Pat. No. 5,945,908 applies to a stationary tire monitoring system and does not use SAW devices.

One of the first significant SAW sensor patents is U.S. Pat. No. 4,534,223. This patent describes the use of SAW devices for measuring pressure and also a variety of methods for temperature compensation but does not mention wireless transmission.

U.S. Pat. No. 5,987,980 describes a tire valve assembly using a SAW pressure transducer in conjunction with a sealed cavity. This patent does disclose wireless transmission. The assembly includes a power supply and thus this also distinguishes it from a preferred system of this invention. It is a SAW system but as stated in the patent, the antenna for interrogating the device in this design must be within one meter.

U.S. Pat. No. 5,698,786 relates to the sensors and is primarily concerned with the design of electronic circuits in an interrogator. U.S. Pat. No. 5,700,952 also describes circuitry for use in the interrogator to be used with SAW devices. In neither of these patents is the concept of using a SAW device in a wireless tire pressure monitoring system described. These patents also do not describe including an identification code with the temperature and/or pressure measurements in the sensors and devices.

U.S. Pat. No. 5,804,729 describes circuitry for use with an interrogator in order to obtain more precise measurements of the changes in the delay caused by the physical or chemical property being measured by the SAW device. Similar comments apply to U.S. Pat. No. 5,831,167. Other related prior art includes U.S. Pat. No. 4,895,017.

Other patents disclose the placement of an electronic device in the sidewall or opposite the tread of a tire but they do not disclose either an accelerometer or a surface acoustic wave device. In most cases, the disclosed system has a battery and electronic circuits.

One method of measuring pressure that is applicable to this invention is disclosed in V. V. Varadan, Y. R. Roh and V. K. Varadan "Local/Global SAW Sensors for Turbulence", IEEE 1989 Ultrasonics Symposium p. 591–594 makes use of a polyvinylidene fluoride (PVDF) piezoelectric film to measure pressure. Mention is made in this article that other piezoelectric materials can also be used. Experimental results are given where the height of a column of oil is measured based on the pressure measured by the piezoelectric film used as a SAW device. In particular, the speed of the surface acoustic wave is determined by the pressure exerted by the oil on the SAW device. For the purposes of the instant invention, air pressure can also be measured in a similar manner by first placing a thin layer of a rubber material onto the surface of the SAW device which serves as a coupling agent from the air pressure to the SAW surface. In this manner, the absolute pressure of a tire, for example, can be measured without the need for a diaphragm and reference pressure greatly simplifying the pressure measurement. Other examples of the use of PVDF film as a pressure transducer can be found in U.S. Pat. Nos. 4,577,510 and 5,341,687, which are incorporated by reference herein, although they are not used as SAW devices.

The following U.S. patents provide relevant information to this invention, and to the extent necessary, all of them are incorporated by reference herein: U.S. Pat. Nos. 4,361,026, 4,620,191, 4,703,327, 4,724,443, 4,725,841, 4,734,698, 5,691,698, 5,841,214, 6,060,815, 6,107,910, 6,114,971, 6,144,332.

In recent years, SAW devices have been used as sensors in a broad variety of applications. Compared with sensors utilizing alternative technologies, SAW sensors possess outstanding properties, such as high sensitivity, high resolution, and ease of manufacturing by microelectronic technologies. However, the most attractive feature of SAW sensors is that they can be interrogated wirelessly and that they can be operated without a battery or other source of power except for the RF signal that is captured by the antenna.

1. Signal Boosting

In the use of SAW sensors for vehicles, one problem which arises is that the vibrations of the vehicle can interfere with or create excessive noise in the signals provided by the SAW sensor in view of the generally low strength of the signal from the SAW sensor. In many cases for SAW tire monitors, for example, an adequate return signal can be obtained while the vehicle is stationary but the signal degrades as the vehicle moves. Thus, whereas the device can operate without power in the stationary mode, it is desirable to have a source powered operation for the case when the vehicle is moving. However, when the vehicle is moving there is a significant amount of energy available in the vehicle tire, and elsewhere in the environment, to permit the powered operation of the SAW device. This is known herein as signal boosting. Such signal boosting, as described below, can increase the gain by as much as 6 db in both directions, or a total of 12 db, or more. The energy generated can be stored on a capacitor, or ultracapacitor, or on a rechargeable battery as appropriate.

Previously, RF MEMS switches have not been used in the tire, RFID or SAW sensor environment such as for TPM (tire pressure monitoring) power and antenna switching. International Application No. WO 03/047035A1 entitled "GPS equipped cellular phone using a SPDT MEMS switch and single shared antenna" describes such a use for cell phones. One example of an RF MEMS switch is manufactured by Teravicta Technologies Inc. The company's initial product, the TT612, is a 0 to 6 GHz RF MEMS single-pole, double-throw (SPDT) switch. It has a loss of 0.14-dB at 2-GHz, good linearity and a power handling capability of three watts continuous, all enclosed within a surface mount package.

Teravicta claims the RF performance of its switch is superior to that of conventional solid-state alternatives such as gallium arsenide FETs and PIN diodes that are used in today's wireless voice and data products.

2. Energy Generation

Several of the above referenced patents have disclosed the use of various non-battery power sources for the use with tire monitors. These include inductive, capacitive and generator systems using a moving weight. Other systems that are disclosed herein for the first time to charge an energy storage device use an RFID circuit, the earth's magnetic field with a coil, a solar sensor, a MEMS or other energy generator that uses the vibrations in the tire and a generator that uses the bending deflection of tread or the deflection of the tire itself relative to the tire rim as sources of energy. These can be used with the boosting circuit with or without an RF MEMS or other appropriate mechanical or electronic switch.

3. Communication, ID

The combination of an RFID with a SAW device has also not been reported in the prior art. This combination in addition to providing energy to boost the SAW system can also provide a tire identification to the interrogator. The ID portion of the RFID can be in the form of a SAW Polyvinylidene Fluoride RFID tag that can be manufactured at low cost. The use of such a PVDF SAW RFID has not previously been reported.

4. Miscellaneous enhancements

A SAW pressure sensor can also be used with bladder weight sensors permitting that device to be interrogated wirelessly and without the need to supply power. This also can use the boosting techniques as disclosed herein.

Similarly, a SAW device can be used as a general switch in a vehicle and in particular as a seatbelt buckle switch indicative of seatbelt use.

The operating frequency of SAW devices has previously been limited to less than about 500 MHz due to manufacturing problems. However, recent advances in the manufacture of diamond films that can be combined with a piezoelectric material such as lithium niobate promise to permit higher frequencies to be used.

The SAW-based tire monitor can preferably be mounted in a vertical plane to minimize the effects of centrifugal acceleration.

The use of a SAW-based TPM (tire pressure monitor), and particularly a boosted SAW-based TPM as described herein, permits the after-market replacement for other battery-powered TPM systems such as those manufactured by Schrader with the replacement product removing the need for a battery and thus periodic replacement.

The use of a piezoelectric generator attached to the tire tread also provides a means to measure the tire footprint and thus a measure of the load on the car and truck tires. This can also be accomplished by the system that is powered by the change in distance between the tread and the rim as the tire rotates, coupled with a measure of the pressure within the tire.

In a different but related invention, the driver is provided with a keyless entry device that can be powerless in the form of an RFID or similar device, that can also be boosted as described herein, and the interrogator determines the proximity of the driver to the vehicle door. If the driver remains within 1 meter from the door, for example, for a time period of 5 seconds, for example, then the door automatically unlocks and even opens in some implementations. Thus, as the driver approaches the trunk with his or her arms filled with groceries and pauses, the trunk can automatically open. Such a system would be especially valuable for older people. Naturally, this system can also be used for other systems in addition to vehicle doors and trunk lids.

Objects and Summary of the Invention

It is an object of the present invention to provide new and improved apparatus and methods for boosting signals to signal-receiving and signal-activated sensors, and boosting signals from signal-generating sensors, exemplifying sensors being a SAW device and an RFID tag, or to and/or from a radar, a GPS or other antenna.

It is another object of the present invention to provide a new and improved arrangement including a SAW device and which provides a boost for a signal to and/or from a signal-generating, signal-receiving, or signal-activated sensor such as a SAW device or RFID tag.

It is still another object of the present invention to provide a new and improved two-port circulator for boosting electronic signals, such as signals to and/or from a SAW device or RFID tag.

It is yet another object of the present invention to provide an energy-supply module for supplying energy to an electricity-requiring component derived from movement, such as a sensor on a vehicle whereby energy is provided by motion of the vehicle or a part or component thereof.

Another object of the present invention is to provide a new tire pumping system and tire incorporating the same whereby the rotation of tire causes inflation of the tire.

Yet another object of the present invention is to provide new electricity generating system for tire which generates electricity upon rotation of the tire which can be stored in an storage device, such as a capacitor or rechargeable battery, or used to power a component in the vehicle, such as a tire pump.

In order to achieve at least one of these objects, an arrangement for providing a boosted signal from a signal-generating device such as a SAW device comprises an antenna and a circulator having a first port connected to the antenna to receive a signal from the antenna and a second port adapted to be connected to the SAW device to provide a signal to the SAW device and receive a signal from the SAW device. The circulator amplifies the signal from the antenna such that the amplified signal is directed to the SAW device and amplifies the signal received from the SAW device such that a twice-amplified signal is directed to the antenna. A receiving and processing module is provided to transmit a signal to the antenna causing the antenna to generate its signal and to receive a signal from the antenna derived from the twice-amplified signal.

The circulator may be arranged to provide a signal gain of 6 dB at 400 MHz, for example, so that a round-trip gain of 12 db or more is provided.

The circulator may comprise a first signal splitter arranged in connection with the first port and a second signal splitter arranged in connection with the second port. A first gain mechanism amplifies the signal being directed from the antenna to the SAW device and second gain mechanism amplifies the signal being directed from the SAW device to the antenna.

An energy-supply module may optionally be provided to supply energy to operate the circulator, or another vehicular component. The energy-supply module may comprise a charging capacitor, at least one movable mass, a mechanical-electrical converter coupled to each mass to convert the movement of the mass into electric signals and a bridge rectifier coupled to each converter. The capacitor is coupled to each bridge rectifier to enable charging of the capacitor during movement of the mass(es). Other alternate energy-supply modules may be optionally provided.

The energy-supply module may also comprise an overcharge protector to prevent overcharging of the capacitor, such as a Zener diode arranged in a parallel with the capacitor.

In an embodiment wherein two masses are provided, the masses may be arranged in perpendicular directions.

Several pumping systems for a tire and the like which inflate the tire upon rotation thereof are disclosed. One embodiment includes a housing adapted to be mounted external to the tire and defining a first fluid-receiving chamber. A mass is movable in the housing in response to rotation of the housing and includes a piston rod movable in the first chamber. A first spring is arranged to be compressed by the mass upon movement thereof caused by rotation of the tire. A first inlet valve is arranged in the housing and leads from ambient atmosphere to the first chamber. A first tube is adapted to connect to a nipple or other inlet of the tire. A first exhaust valve is arranged in the housing and provides a flow connection from the first chamber to the first tube. In operation, upon rotation of the tire, the mass moves causing the piston to move in the first chamber and alternately draw air into the first chamber through the first inlet valve and force air through the first exhaust valve into the tube to the nipple to inflate the tire.

To improve the pumping of air into the tire, the housing an also include a second fluid-receiving chamber with the piston rod being movable therein. A second spring is compressed by the mass upon movement thereof in an opposite direction from a direction in which the first spring is compressed by the mass. A second inlet valve is arranged in the housing and leads from ambient atmosphere to the second chamber. A second tube is adapted to connect to a nipple or other inlet of the tire. A second exhaust valve is arranged in the housing and provides a flow connection from the second chamber to the second tube.

With regard to the springs, they may be arranged on opposite sides of the mass and may be linear or non-linear springs.

The housing can include one or more cylinders each defining one or more of the chambers.

An electricity generating system for a vehicle having a tire, which can be used to power a pumping system or charge a battery, comprises a housing adapted to be mounted external to the tire and including a first cylinder defining a first chamber and a first coil wrapped around the first cylinder. A mass is movable in the housing in response to rotation thereof and includes a magnetic piston rod movable in the first chamber. A first spring is compressed by the mass upon movement thereof. An energy storage or load device is connected to the first coil. During vehicular operation, upon rotation of the tire, the mass moves causing the piston to move in the first chamber and impart a charge to the first coil which is stored or used by the energy storage or load device.

The housing may include a second cylinder defining a second chamber and a second coil wrapped around the second cylinder. In this case, the piston rod is movable in the second chamber and the energy storage or load device is connected to the second coil. A second spring is compressed by the mass upon movement thereof in an opposite direction from a direction in which the first spring is compressed by the mass. In operation, upon rotation of the tire, the mass moves causing the piston to alternatingly move in the first and second chambers and impart a charge to the first or second coil which is stored or used by the energy storage or load device. The springs may be arranged on opposite sides of the mass and may be linear or non-linear springs.

Another embodiment of an electricity generating system for a vehicle having a tire in accordance with the invention comprises a housing adapted to be mounted inside the tire and including a coil defining a chamber, a magnetic piston movable in the chamber in response to rotation of the housing and an energy storage or load device connected to the coil. Upon rotation of the tire, the piston moves in the chamber and imparts a charge to the first coil which is stored or used by the energy storage or load device.

Another embodiment of a pumping system for a tire which inflates the tire upon rotation of the tire comprises a housing adapted to be mounted inside the tire and defining an air-receiving chamber, a piston movable in the chamber in response to rotation of the housing and intake mechanism arranged in connection with the piston and adapted to have an inlet external of the tire. The intake mechanism provides a conduit from ambient atmosphere to the chamber. An exhaust valve is arranged in the housing for providing a flow connection from the chamber to an interior of the tire. During vehicular operation, upon rotation of the tire, the piston moves in the chamber and alternately draws air into the chamber through the intake mechanism and forces air through the exhaust valve into the tire. The intake mechanism may comprise a rod for connecting a wheel rim to the piston.

An embodiment of a tire including an electricity generating system in accordance with the invention comprises a rubber substrate defining side walls, a tread, a pad made from a piezoelectric material and attached to an inner surface of the substrate adjacent to the tread and a circuit coupled to the pad and including an energy storage device. During vehicular operation, upon rotation of the tire, the pad flexes causing a charge to appear on opposite sides of the pad thereby creating a voltage which is processed by the circuit to charge the energy storage device. The pad may include a plurality of layers of piezoelectric material, for example, a plurality of sections of piezoelectric material joined together to form a belt stretching around an inner circumference of the substrate. The piezoelectric material may be polyvinylidene fluoride.

Another embodiment of a tire including an electricity generating system comprises a rubber substrate defining side walls, a tread, a housing mounted on an inner surface of the tread and defining an air-receiving chamber and a piston movable in the chamber in response to rotation of the housing. An intake mechanism is arranged in connection with the piston and has an inlet external of the tire when the tire is mounted on a wheel rim. The intake mechanism provides a conduit from the ambient atmosphere, or any location outside of the interior of the tire, to the chamber. An exhaust valve is arranged in the housing and provides a flow connection from the chamber to an interior of the tire. During vehicular operation, upon rotation of the tire, the piston moves in the chamber and alternately draws air into the chamber through the intake mechanism and forces air through the exhaust valve into the tire. The intake mechanism may comprise a rod for connecting a wheel rim to the piston.

Also disclosed herein is a method for providing energy to boost a SAW-based tire pressure monitor which comprises the steps of mounting the SAW-based tire pressure monitor on each tire of a vehicle and coupling a tag to the tire pressure monitor on each tire, each tag including an antenna, a capacitor and an electronic circuit. The electronic circuit includes a circulator having a first port connected to the antenna to receive a signal from the antenna and a second port connected to the tire pressure monitor to provide a signal to the tire pressure monitor and receive a signal from the tire pressure monitor. The circulator receives energy from the capacitor and amplifies the signal from the antenna such that the amplified signal is directed to the tire pressure monitor and also preferably amplifies the signal received from the tire pressure monitor such that a twice-amplified signal is directed to the antenna. The electronic circuit in each tag may include a memory containing a unique identification code for the tag.

Also disclosed is an arrangement for opening a trunk or door of a vehicle including an interrogator adapted to be arranged on the vehicle, a keyless entry device including an antenna and a circuit including a circulator for boosting signals to and from the antenna and a memory containing a unique identification code and a device for opening the trunk or door. The device is coupled to the interrogator and opens the trunk or door when the keyless entry device is a set distance from the interrogator for a certain duration of time.

BRIEF DESCRIPTION OF THE DRAWINGS

The following drawings are illustrative of embodiments of the invention and are not meant to limit the scope of the invention as encompassed by the claims.

FIG. 6 is a view of a wheel including a tire pumping system in accordance with the invention.

FIG. 6A is an enlarged view of the tire pumping system shown in FIG. 6.

FIG. 6B is an enlarged view of the tire pumping system shown in FIG. 6 during a pumping stroke.

FIG. 9A is a front view of an energy generator based on changes in the distance between the tire tread and rim.

FIG. 9B shows a view of a first embodiment of a piston assembly of the energy generator shown in FIG. 9A.

FIG. 9C shows a view of a second embodiment of a piston assembly of the energy generator shown in FIG. 9A.

FIG. 9D shows a position of the energy generator shown in FIG. 9A when the tire is flat.

FIG. 10A illustrates a driver with a timed RFID standing with groceries by a closed trunk.

FIG. 10B illustrates the driver with the timed RFID 5 seconds after the trunk has been opened.

FIG. 10C illustrates a trunk opening arrangement for a vehicle in accordance with the invention.

DETAILED DESCRIPTION OF THE INVENTION

1. Boosting Signals

Figure 1:
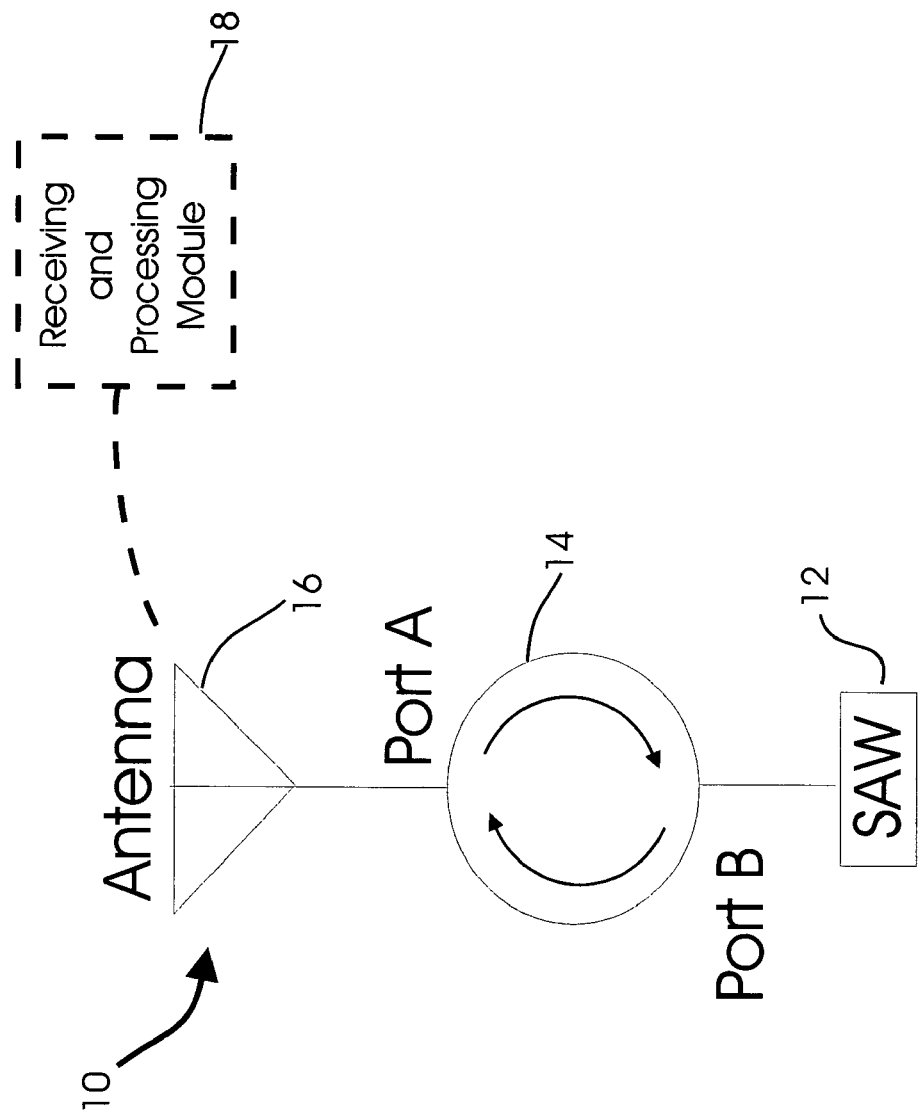
FIG. 1 is a schematic illustration of an arrangement for boosting signals to and from a SAW device in accordance with the invention.

Referring to the accompanying drawings wherein like reference numerals refer to the same or similar elements, an arrangement for providing a boosted signal from a SAW device is designated generally as 10 and comprises a SAW device 12, a circulator 14 having a first port or input channel designated Port A and a second port or input channel designated Port B, and an antenna 16 (see FIG. 1). The circulator 14 is interposed between the SAW device 12 and the antenna 16 with Port A receiving a signal from the antenna 16 and Port B receiving a signal from the SAW device 12.

In use, the antenna 16 receives a signal when a measurement from the SAW device 12 is desired and a signal from the antenna 16 is switched into Port A where it is amplified and output to Port B. The amplified signal from Port B is directed to the SAW device 12 for the SAW device 12 to provide a delayed signal indicative of the property or characteristic measured or detected by the SAW device 12. The delayed signal is directed to Port B of the circulator 14 which boosts the delayed signal and outputs the boosted, delayed signal to Port A from where it is directed to the antenna 16 for transmission to a receiving and processing module 18.

The receiving and processing module 18 transmits the initial signal to the antenna 16 when a measurement or detection by the SAW device 12 is desired and then receives the delayed, boosted signal from the antenna 16 containing information about the measurement or detection performed by the SAW device 12.

Figure 2:
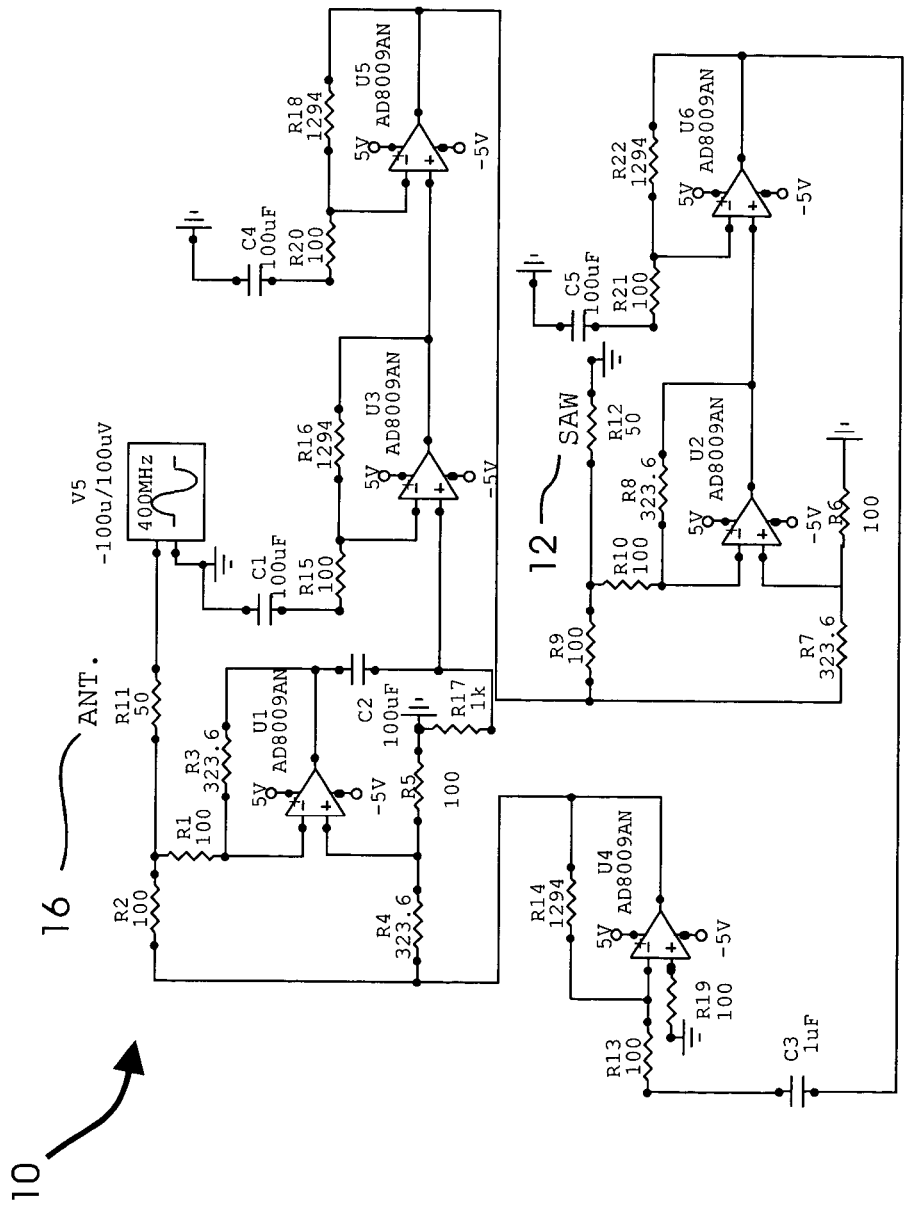
FIG. 2 is a schematic of a circuit used in the boosting arrangement of FIG. 1.

Circulator 14 includes a circuit which amplifies the signal from the antenna 16 and the delayed signal from the SAW device 12 is shown in FIG. 2. With the components shown in FIG. 2, the circuit provides an amplification of approximately 6 db in each direction for a total, round-trip signal gain of 12 db. Naturally, this circuit requires power as described herein which can be supplied by a battery or generator. A detailed description of the circuit is omitted as it will be understood by those skilled in the art.

Figure 3:
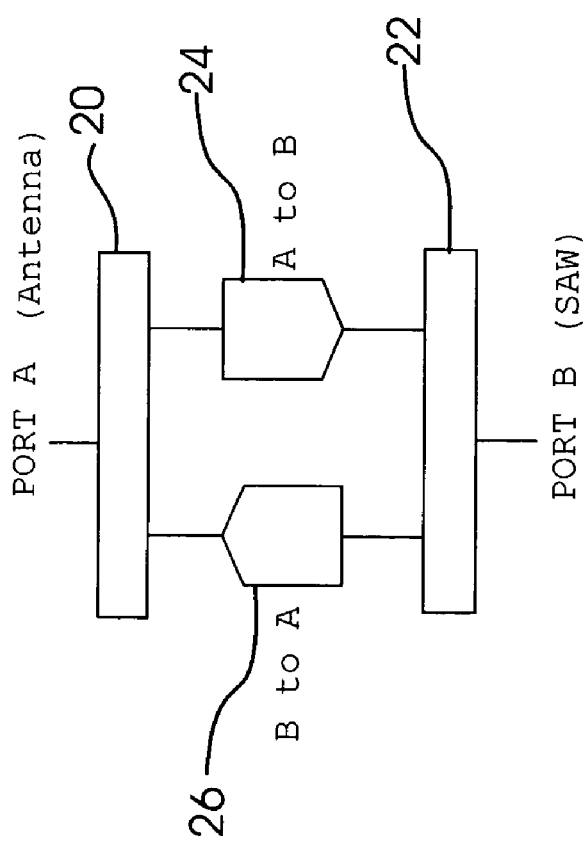
FIG. 3 is a block diagram of the components of the circuit shown in FIG. 2.

As shown in FIG. 3, the circuit of FIG. 2 includes electronic components arranged to form a first signal splitter 20 in connection with the first port, Port A, adjacent the antenna 16 and a second signal splitter 22 in connection with the second port, Port B, adjacent the SAW device 12. Electronic components are also provided to amplify the signal being directed from the antenna 16 to the SAW device 12 (gain component 24) and to amplify the signal being directed from the SAW device 12 to the antenna 16 (gain component 26).

The circuit of the circulator 14 is powered by a battery, of either a conventional type of an atomic battery, or, when used in connection with a tire of the vehicle, a super capacitor or ultracapacitor (super cap) and charged by, for example, rotation of the tire or movement of one or more masses as described in more detail below. Thus, when the vehicle is moving, the circuit is in an active mode and a capacitor in the circuit is charged. On the other hand, when the vehicle is stopped, the circuit is in a passive mode and the capacitor is discharged. In either case the pressure measurement in the tire can be transmitted to the interrogator.

Instead of a SAW device 12, Port B can be connected to an RFID (radio frequency identification) tag or another electrical component which provides a response based on an input signal and/or generates a signal in response to a detected or measured property or characteristic.

Also, the circuit can be arranged on other movable structures, other than a vehicle tire, whereby the movement of the structure causes charging of the capacitor and when the structure is not moving, the capacitor discharges and provides energy. Other movable structures include other parts of a vehicle including trailers and containers, boats, airplanes etc., a person, animal, wind or wave operated device, tree or any structure, living or not that can move and thereby permit a properly designed energy generator to generate electrical energy. Naturally other sources of environmental energy can be used consistent with the invention such as wind, solar, tidal, thermal, acoustic etc.

Figure 4:
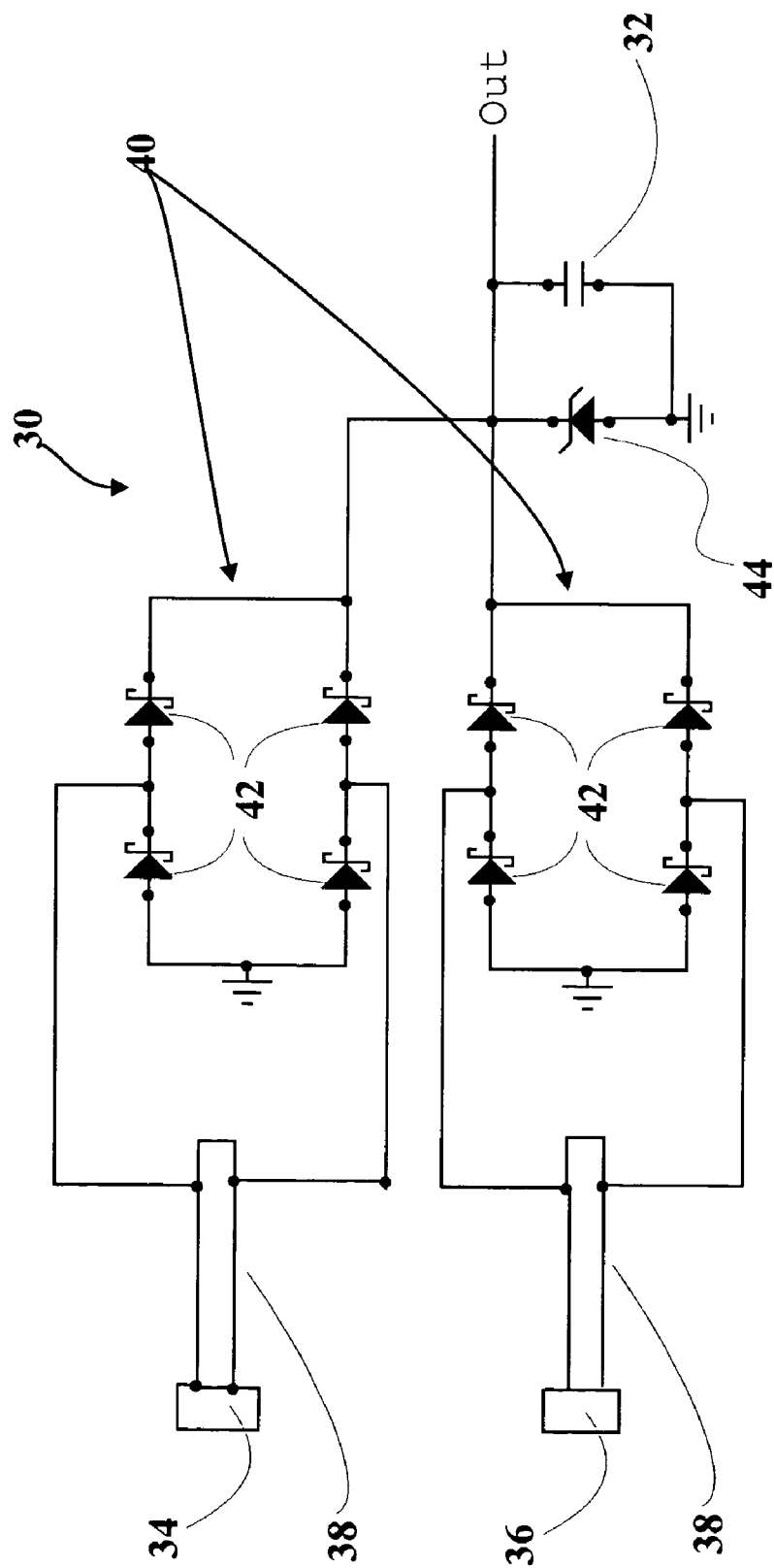
FIG. 4 is a schematic of a circuit used for charging a capacitor during movement of a vehicle which may be used to power the boosting arrangement of FIG. 1.
Figure 5:
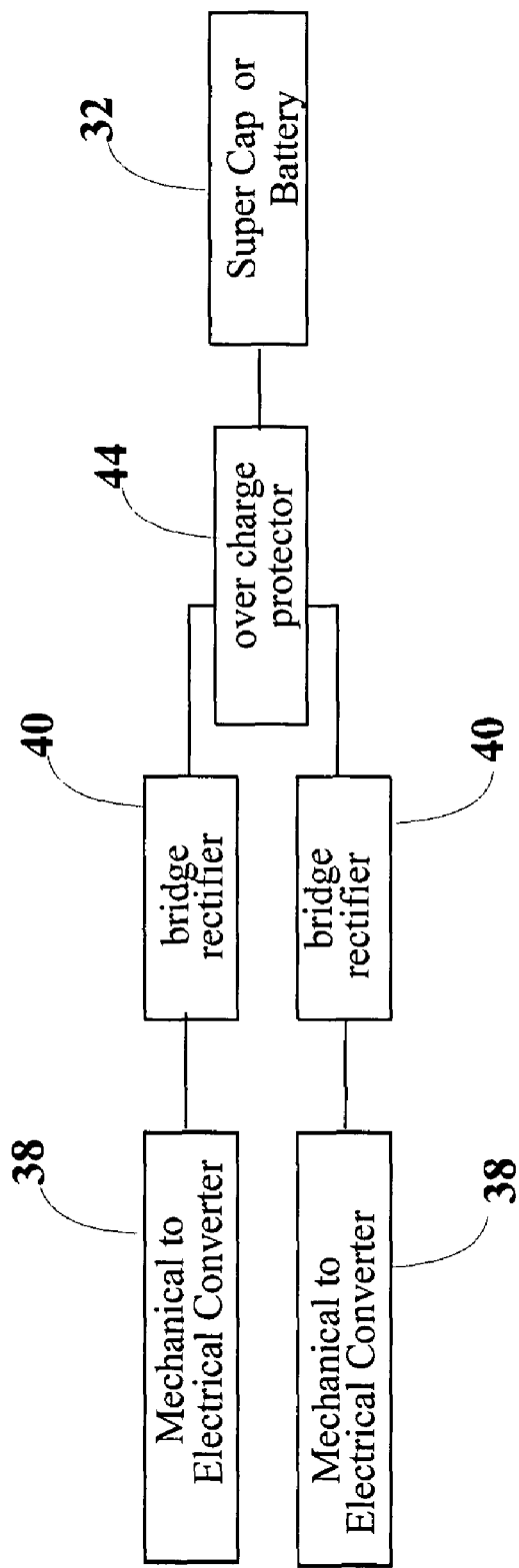
FIG. 5 is a block diagram of the components of the circuit shown in FIG. 4.

FIGS. 4 and 5 show a circuit used for charging a capacitor during movement of a vehicle which may be used to power the boosting arrangement of FIG. 1 or for any other application in which energy is required to power a component such as of a vehicle. The energy can be generated by the motion of the vehicle so that the capacitor has a charging mode when the vehicle is moving (the active mode) and a discharge, energy-supplying phase when the vehicle is stationary or not moving sufficient fast to enable charging (the passive mode).

As shown in FIGS. 4 and 5, the charging circuit 30 has a charging capacitor 32 and two masses 34,36 (FIG. 4) mounted perpendicular to one another (one in a direction orthogonal or perpendicular to the other). The masses 34,36 are each coupled to mechanical-electrical converters 38 to convert the movement of the mass into electric signals and each converter 38 is coupled to a bridge rectifier 40. Bridge rectifiers 40 may be the same as one another or different and are known to those skilled in the art. As shown, the bridge rectifiers 40 each comprise four Zener diodes 42. The output of the bridge rectifiers 40 is passed to the capacitor 32 to charge it. A Zener diode 44 is arranged in parallel with the capacitor 32 to prevent overcharging of the capacitor 32. Instead of capacitor 32, multiple capacitors or a rechargeable battery or other energy-storing device or component can be used.

An RF MEMS or equivalent switch, not shown, can be added to switch the circulator 14 into and out of the circuit slightly increasing the efficiency of the system when power is not present. Previously, RF MEMS switches have not been used in the tire, RFID or SAW sensor environment such as for TPM power and antenna switching. One example of an RF MEMS switch is manufactured by Teravicta Technologies Inc. The company's initial product, the TT612, is a 0 to 6 GHz RF MEMS single-pole, double-throw (SPDT)

switch. It has a loss of 0.14-dB at 2-GHz, good linearity and a power handling capability of three watts continuous, all enclosed within a surface mount package.

2. Energy Generation

There are a variety of non-conventional battery and battery-less power sources for the use with tire monitors, some of which also will operate with other SAW sensors. One method is to create a magnetic field near the tire and to place a coil within the tire that passes through the magnetic field and thereby generates a current. Another method is to create an electric field and capacitively couple to a circuit within the tire that responds to an alternating electric field external to the tire and thereby induce a current in the circuit within the tire. One prior art system uses a weight that responds to the cyclic change in the gravity vector as the tire rotates to run a small pump that inflates the tire. That principle can also be used to generate a current as the weight moves back and forth.

A novel method is to use a small generator that can be based on MEMS or other principles in a manner to that discussed in Gilleo, Ken, "Never Need Batteries Again" appearing at http://www.e-insite.net/epp/index.asp?layout=article&articleid=CA219070, which is incorporated herein by reference in its entirety. This article describes a MEMS energy extractor that can be placed on any vibrating object where it will extract energy from the vibrations. Naturally, such a device would need to be especially designed for use in tire monitoring, or other vehicle or non-vehicle application, in order to optimize the extraction of energy. The device would not be limited to the variations in the gravity vector, although it could make use of it, but could also generate electricity from all motions of the tire including those caused by bumps and uneven roadways. The greater the vibration, the more electric power that will be generated.

FIGS. 6, 6A and 6B illustrate a tire pumping system having a housing 50 for mounting external to a tire 46, e.g., on the wheel rim 48. This particular design is optimized for reacting to the variation in a gravitational vector as the wheel rotates and is shown in the pumping design implementation mode. The housing 50 includes a mass 51 responsive to the gravitational vector as the wheel rotates and a piston rod 56 connected to or formed integral with the mass 51. The mass 51 may thus have an annular portion (against which springs 52 bear) and an elongated cylindrical portion (movable in chambers 57A,57B) as shown. The mass 51 alternately compresses the springs 52, one on each side of the mass 51, and draws in air through inlet valves 54 and exhausts air through exhaust valves 55 to enter the tire 46 through nipples 53. Mass 51 is shown smaller that it would in fact be. To minimize the effects of centrifugal acceleration, the mass 51 is placed as close as possible to the wheel axis.

When the mass 51 moves in one direction, for example to the left in FIGS. 6A and 6B, the piston rod 56 fixed to the mass 51 moves to the left so that air is drawn into a chamber 57A defined in a cylinder 58A through the inlet valve 54. Upon subsequent rotation of the wheel, the mass 51 moves to the right causing the piston rod 56 to move to the right and force the air previously drawn into chamber 57A through an exhaust valve 55 and into a tube 59A leading to the nipple 53 and into the tire 46. During this same rightward movement of the piston rod 56, air is drawn into a chamber 57B defined in a cylinder 58B through the other inlet valve 54. Upon subsequent rotation of the wheel, the mass 51 moves to the left causing the piston rod 56 to move to the left and force the air previously drawn into chamber 57B through an exhaust valve 55 and into a tube 59B leading to the nipple 53 and into the tire 46. In this manner, the reciprocal movement of the mass 51 results in inflation of the tire 46.

Valves 54 are designed as inlet valves and do not allow flow from the chambers 57A,57B to the surrounding atmosphere. Valves 55 are designed as exhaust valves and do not allow flow from the tubes 59A,59B into the respective chamber 57A,57B.

In operation, other forces such as caused by the tire impacting a bump in the road will also effect the pump operation and in many cases it will dominate. As the wheel rotates (and the mass 51 moves back and forth for example at a rate of mg cos($\omega$ t), the tire 46 is pumped up.

In the illustrated embodiment, the housing 50 includes two cylinders 58A,58B each defining a respective chamber 57A,57B, two springs 52, two tubes 59 and an inlet and exhaust valve for each chamber 57A,57B. It is possible to provide a housing having only a single cylinder defining one chamber with an inlet and exhaust valve, and associated tube leading to a nipple of the tire. The mass would thus inflate the tire at half the inflation rate when two cylinders are provided (assuming the same size cylinder were to be provided). It is also contemplated that a housing having three cylinders and associated pumping structure could be provided. The number of cylinders could depend on the number of nipples on the tire. Also, it is possible to have multiple cylinders leading to a common tube leading to a common nipple.

Figure 6C:
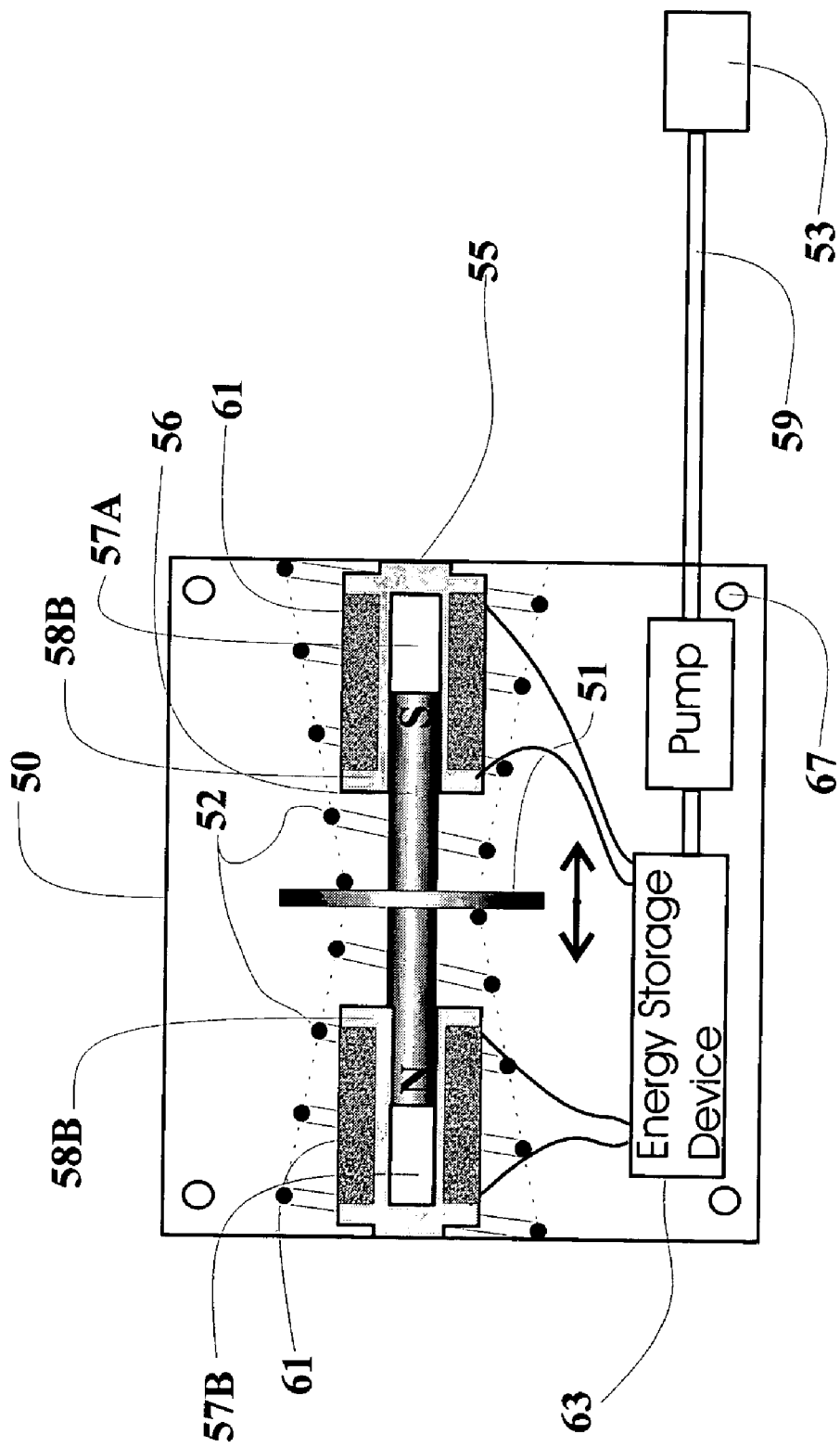
FIG. 6C is an enlarged view of an electricity generating system used for powering a pump.

Alternately, instead of a pump which is operated based on movement of the mass, an electricity generating system can be provided which powers a pump or other device on the vehicle. FIG. 6C shows an electricity generating system in which the mass 51A is magnetized and include a piston rod 56 and coils 61 are wrapped around cylinders 58A,58B which define chambers 57A,57B in which the piston rod 56 moves. As the tire rotates, the system generates electricity and charges up a storage device 63 as described above. Thus, in this embodiment of an electricity generating system, the housing 50 is mounted external to the tire 46 and includes one or more cylinders 58A,58B each defining a chamber 57A,57B. The mass 51 is movable in the housing 50 in response to rotation thereof and includes a magnetic piston rod 56 movable in each chamber 57A,57B. The magnetic piston rod 56 may be formed integral with or separate from, but connected to, the mass 51. A spring is compressed by the mass 51 upon movement thereof and if two springs 52 are provided, each may be arranged between a respective side of the mass 51 and the housing 50 and compressed upon movement of the mass 51 in opposite directions. An energy storage or load device 63 is connected to each coil 61, e.g., by wires, so that upon rotation of the tire, the mass 51 moves causing the piston 56 to move in each chamber 57A,57B and impart a charge to each coil 61 which is stored or used by the energy storage or load device 63. When two coils 61 are provided, upon rotation of the tire, the mass 51 moves causing the piston rod 56 to alternatingly move in the chambers 57A,57B relative to the coils 61 and impart a charge alternatingly to one or the other of the coils 61 which is stored or used by the energy storage or load device 63.

If the energy storage device 63 is used to power a tire pump 65 and coupled thereto by a wire 69, then a tube 59 is provided to coupled the pump 65 to the nipple 53 of the tire. Obviously, the pump 65 must communicate with the atmosphere through the housing walls to provide an intake air flow.

The housing 50 may be mounted to the wheel rim or tire via any type of connection mechanism, such as screws 67. In the alternative, the housing 50 may be integrally constructed with the wheel rim.

Figure 7B:
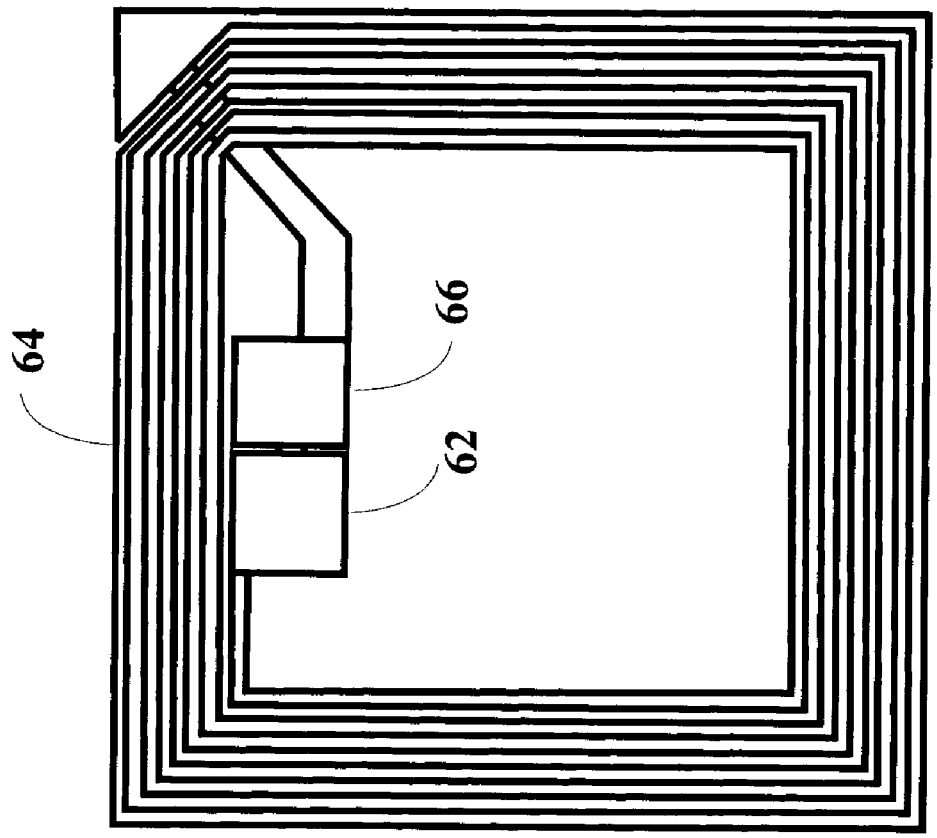
FIGS. 7A and 7B illustrate two embodiments of an RFID energy generator in accordance with the invention.
Figure 7A:
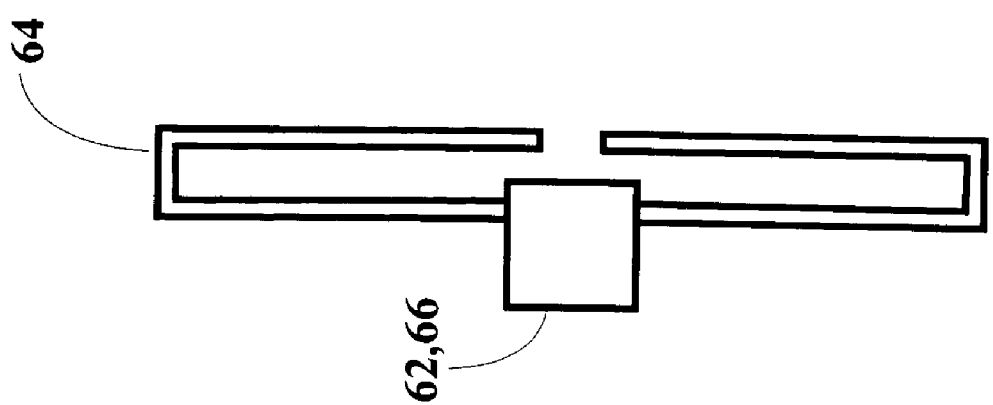

Non-linear springs 52 can be used to help compensate for the effects of centrifugal accelerations. Naturally, this design will work best at low vehicle speeds or when the road is rough. FIGS. 7A and 7B illustrate two versions of an RFID tag, FIG. 7A is optimized for high frequency operation such as a frequency of about 2.4 GHz and FIG. 7B is optimized for low frequency operation such as a frequency of about 13.5 MHz. The operation of both of these tags is described in U.S. Pat. No. 6,486,780 which is incorporated herein by reference and each tag comprises an antenna 64, an electronic circuit 62 and a capacitor 66. The circuit 62 contains a memory that contains the ID portion of the tag. For the purposes herein, it is not necessary to have the ID portion of the tag present and instead, the tag can be used to charge a capacitor 66 which can then be used to boost the signal of the SAW TPM as described above. The frequency of the tag can be set to be the same as the SAW TPM or it can be different permitting a dual frequency system which can make better use of the available electromagnetic spectrum. For energy transfer purposes, a wideband or ultra-wideband system that allows the total amount of radiation within a particular band to be minimized but spreads the energy over a wide band can also be used.

Other systems that can be used to generate energy include a coil and appropriate circuitry, not shown, that cuts the lines of flux of the earth's magnetic field, a solar battery attached to the tire sidewall, not shown, and a MEMS or other RF-based energy generators which uses the vibrations in the tire. The bending deflection of tread or the deflection of the tire itself relative to the tire rim can also be used as sources of energy, as disclosed below. All of these systems can be used with the boosting circuit with or without an RF MEMS or other appropriate mechanical or electronic switch.

Figure 8A:
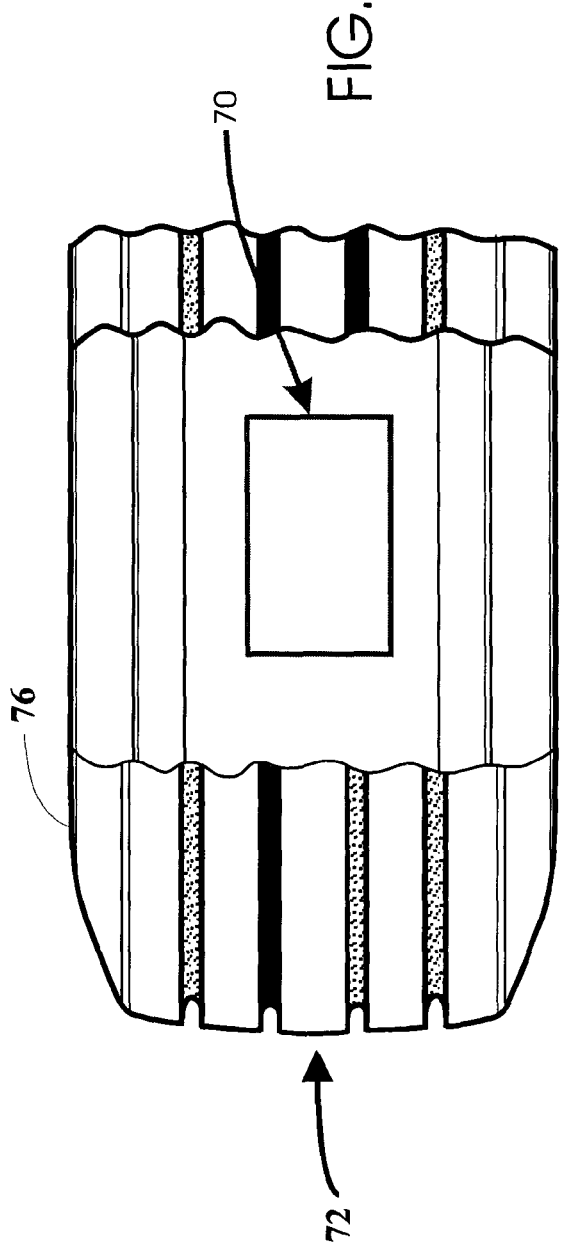
FIG. 8A shows a front view, partially broken away of a PVDF energy generator in accordance with the invention.
Figure 8B:
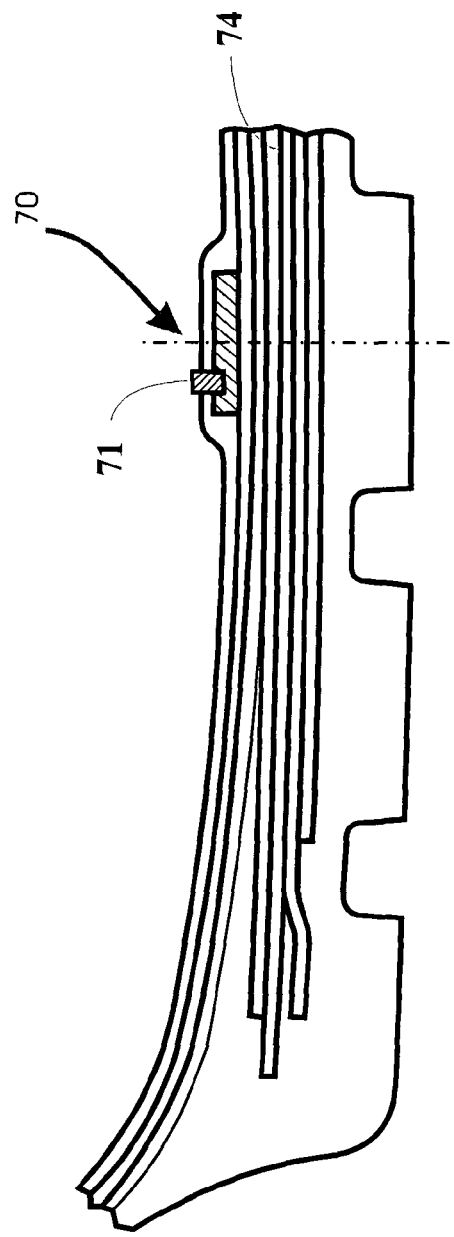
FIG. 8B is a cross-sectional view of the PVDF energy generator shown in FIG. 8A.

FIGS. 8A and 8B illustrate a pad 70 made from a piezoelectric material such as Polyvinylidene Fluoride (PVDF) that is attached to the inside of the tire 72 adjacent to the tread 74 and between the side walls 76. As the material of the pad 70 flexes when the tire 72 rotates and brings the pad 70 close to the ground, a charge appears on different sides of the pad 70 thereby creating a voltage that can be used along with appropriate circuitry 71 to charge an energy storage device. Similarly, as the pad 70 leaves the vicinity of the road surface and returns to its original shape, another voltage appears of the opposite polarity thus creating an alternating circuit. The appropriate circuitry 71 then rectifies the current and charges the energy storage device, possibly incorporated within the circuitry 71.

Variations include the use of a thick layer of piezoelectric material or many parallel layers of piezoelectric material to increase the energy generating capacity. Additionally, many pad sections can be joined together to form a belt that stretches around the entire, inner circumference of the tire 72 to again increase the energy-generating capacity and allow for a simple self-supporting installation. Through a clever choice of geometry known or readily determinable to those skilled in the art, a substantial amount of generating capacity can be created and more than enough power produced to operate the booster as well as other circuitry. Furthermore, PVDF is an inexpensive material so that the cost of this generator is small. Since substantial electrical energy can be generated by this system, an electrical pump can be driven to maintain the desired tire pressure for all normal deflation cases. Naturally, such a system will not suffice if a blowout occurs.

A variety of additional features can also be obtained from this geometry such as a measure of the footprint of the tire and thus, when combined with the tire pressure, a measure of the load on the tire can be obtained. Vibrations in the tire caused by exposed steel belts, indicating tire wear, a nail, bulge or other defect will also be detectable by appropriate circuitry that monitors the information available on the generated voltage or current. This can also be accomplished by the system that is powered by the change in distance between the tread and the rim as the tire rotates coupled with a measure of the pressure within the tire.

FIGS. 9A, 9B, 9C and 9D illustrate another tire pumping and/or energy-generating system based on the principle that as the tire rotates, the distance from the rim to the tire tread or ground changes and that fact can be used to pump air or generate electricity. In the embodiment shown in FIGS. 9A and 9B, air enters from the atmosphere enters a chamber 88 in a housing or cylinder 82 through an inlet or intake valve 83 during the up-stroke of a piston 81, and during the down stroke of the piston 81, the air is compressed in the chamber 88 in the cylinder 82 and flows out of exhaust valve 89 into the tire. The piston 81 thus moves at least partly in the chamber 88 in the cylinder 83. A conduit is provided in the piston 81 in connection with the inlet valve 83 to allow the flow of air from the ambient atmosphere to the chamber 88 in the cylinder 82.

In the electrical energy-generating example (FIG. 9C), a piston 85 having a magnet that creates magnet flux travels (the up and down stroke occur at least partly within the space enclosed by the coil 84) within a coil 84 and electricity is generated. The electricity is rectified, processed and stored as in the above examples. Naturally, the force available can be substantial as a portion of the entire load on the tire can be used.

The rod connecting the rim to the device can be designed to flex under significant load so that the entire mechanism isn't subjected to full load on the tire if the tire does start going flat. Alternately, a failure mode can be designed into the mechanism so that a replaceable gasket 86, or some other restorable system, permits the rod of the device to displace when the tire goes flat as, for example, when a nail 87 punctures the tire (see FIG. 9D). This design has a further advantage in that when the piston 81 bottoms out indicating a substantial loss of air or failure of the tire, a once-per-revolution vibration that should be clearly noticeable to the driver occurs. Naturally, several devices can be used and positioned so that they remain in balance.

3. Communication, ID

One problem that has been discussed in patents and literature on tire monitoring is the determination of which tire has what pressure. A variety of approaches have been suggested in the current assignee's patents and patent applications including placing an antenna at each wheel, the use of highly directional antennas (one per wheel but centrally located), the use of multiple antennas and measuring the time of arrival of the pulses and the use of an identification code, such as a number, that is transmitted along with the tire pressure and temperature readings. For this latter case, the combination of an RFID with a SAW TPM is suggested herein. Such a combination RFID and SAW in addition to providing energy to boost the SAW system, as described above, can also provide a tire ID to the interrogator. The ID portion of the RFID can be a number stored in memory or it can be in the form of another SAW device. In this case, a Polyvinylidene Fluoride RFID tag can be used that can be manufactured at low cost.

The PVDF ID inter-digital transducers (IDTs) can be printed onto the PVDF material using an ink jet printer, for example, or other printing method and thus create an ID tag at a low cost and remove the need for a memory in the RFID electronic circuit.

4. Miscellaneous Enhancements

A SAW pressure sensor can also be used with bladder weight sensors permitting that device to be interrogated wirelessly and without the need to supply power. Similarly, a SAW device can be used as a general switch in a vehicle and in particular as a seatbelt buckle switch indicative of seatbelt use. Such systems can be boosted as disclosed herein or not as required by the application. Both of these inventions are disclosed in the current assignee's patent applications.

The operating frequency of SAW devices has previously been limited to less that about 500 MHz due to problems in lithography resolution, which of course is constantly improving. This is related to the speed of sound in the SAW material. Diamonds have the highest speed of sound and thus would be an ideal SAW material. However, diamonds are not piezoelectric. This problem can be solved partially by using a combination or laminate of diamonds and a piezoelectric material. Recent advances in the manufacture of diamond films that can be combined with a piezoelectric material such as lithium niobate promises to permit higher frequencies to be used since the spacing between the inter-digital transducer (IDT) fingers can be increased for a given frequency. A particularly attractive frequency is 2.4 GHz or Wi-Fi as the potential exists for the use of more sophisticated antennas such as the yagi antenna that have more gain and directionality.

Note that the SAW based tire monitor can preferably be mounted in a vertical plane to minimize the effects of centrifugal acceleration. This is particularly important with SAW devices due to the low signal level, unless boosted, and the noise that can be introduced into the system by mechanical vibrations, for example.

The use of a SAW-based TPM, and particularly a boosted SAW-based TPM as described herein, permits the aftermarket replacement for other battery powered TPM systems, such as those manufactured by Schrader, which is mounted on the tire valve with a battery-less replacement product removing the need periodic replacement.

In a related invention, the driver can be provided with a keyless entry device, other RFID tag, smart card or cell phone with an RF transponder, that can be powered in the form of an RFID or similar device, which can also be boosted as described herein. The interrogator determines the proximity of the driver to the vehicle door or other similar object such as a building or house door or vehicle trunk. As shown in FIG. 10A, if a driver 94 remains within 1 meter, for example, from the door or trunk lid 92, for example, for a time period such as 5 seconds, then the door or trunk lid 92 can automatically unlock and even open in some implementations. Thus, as the driver 94 approaches the trunk with his or her arms filled with packages 93 and pauses, the trunk can automatically open (see FIG. 10B). Such a system would be especially valuable for older people. Naturally, this system can also be used for other systems in addition to vehicle doors and trunk lids.

As shown in FIG. 10C, an interrogator 96 is placed on the vehicle, e.g., in the trunk 98 as shown, and transmits waves. When the keyless entry device 100, which contains an antenna 102 and a circuit including a circulator 104 and a memory containing a unique ID code 106, is a set distance from the interrogator 96 for a certain duration of time, the interrogator 96 directs a trunk opening device 108 to open the trunk 98.

Although several preferred embodiments are illustrated and described above, there are possible combinations using other geometries, sensors, materials and different dimensions for the components that perform the same functions. This invention is not limited to the above embodiments and should be determined by the following claims. There are also numerous additional applications in addition to those described above. This invention is not limited to the above embodiments and should be determined by the following claims.

We claim:

1. An arrangement for providing a boosted signal from a signal-generating or modifying device on a vehicle, comprising:

an antenna arranged on the vehicle;

a circulator arranged on the vehicle and having a first port connected to said antenna to receive a signal from said antenna and a second port adapted to be connected to the signal-generating or modifying device to provide a signal to the signal-generating or modifying device and receive a signal from the signal-generating or modifying device, said circulator being structured and arranged to amplify the signal from said antenna such that the amplified signal is directed to the signal-generating or modifying device and amplify the signal received from the signal-generating or modifying device such that a twice-amplified signal is directed to said antenna.

2. The arrangement of claim 1, further comprising a receiving and processing module arranged on the vehicle for transmitting a signal to said antenna causing said antenna to generate its signal and for receiving a signal from said antenna derived from the twice-amplified signal.

3. The arrangement of claim 1, wherein said circulator is arranged to provide a signal gain of about 6 dB at 400 MHz.

4. The arrangement of claim 1, wherein said circulator comprises a first signal splitter arranged in connection with said first port and a second signal splitter arranged in connection with said second port.

5. The arrangement of claim 4, wherein said circular further comprises first gain means for amplifying the signal being directed from said antenna to the signal-generating or modifying device and second gain means for amplifying the signal being directed from the signal-generating or modifying device to said antenna.

6. The arrangement of claim 1, wherein the signal-generating or modifying device is a surface-acoustic-wave sensor.

7. The arrangement of claim 1, wherein the signal-generating or modifying device is a radio-frequency identification tag.

8. The arrangement of claim 1, wherein the signal-generating or modifying device is a surface-acoustic-wave tire pressure monitor arranged in connection with a tire of the vehicle to monitor the tire.

9. The arrangement of claim 1 wherein the signal-generating or modifying device is a tire pressure monitor arranged in connection with a tire of the vehicle to monitor the tire.

10. The arrangement of claim 1, further comprising an energy-supply module arranged on the vehicle for supplying energy to operate said circulator.

11. The arrangement of claim 10, wherein said energy-supply module comprises a capacitor, at least one movable mass, a mechanical-electrical converter coupled to each of said at least one mass to convert the movement of the mass into electric signals and a bridge coupled to each converter, said capacitor being coupled to said bridge to enable charging of said capacitor during movement of said at least one mass.

12. The arrangement of claim 7, wherein said energy-supply module further comprises an over-charge protector to prevent overcharging of said capacitor.

13. The arrangement of claim 8, wherein said over-charge protector is a Zener diode arranged in a parallel with said capacitor.

14. The arrangement of claim 7, wherein said at least one mass comprises two masses arranged in perpendicular directions.

15. The arrangement of claim 10, wherein said energy-supply module comprises a flexible pad made from a piezoelectric material and a circuit coupled to said pad and including an energy storage device whereby upon movement of the vehicle, said pad flexes causing a charge to appears on opposite sides of said pad thereby creating a voltage which is processed by said circuit to charge said energy storage device.

16. The arrangement of claim 15, wherein said pad is attachable to an inner surface of a rubber substrate defining side walls of a tire adjacent to a tread of the tire, whereby upon rotation of the tire, said pad flexes causing a charge to appears on opposite sides of said pad thereby creating a voltage which is processed by said circuit to charge said energy storage device.

17. The arrangement of claim 16, wherein the signal-generating or modifying device is a tire pressure monitor arranged in connection with the tire to monitor the tire.

18. The arrangement of claim 15, wherein said pad includes a plurality of layers of piezoelectric material.

19. The arrangement of claim 15, wherein said pad comprises a plurality of sections of piezoelectric material joined together to form a belt stretching around an inner circumference of said substrate.

20. The arrangement of claim 15, wherein said piezoelectric material is polyvinylidene fluoride.

21. The arrangement of claim 10, wherein said energy-supply module comprises a housing adapted to be mounted on the vehicle, said housing including a first cylinder defining a first chamber and a first coil wrapped around said first cylinder;
a mass movable in said housing in response to rotation of said housing and including a magnetic piston rod movable in said first chamber;
a first spring compressed by said mass upon movement of said mass; and
an energy storage or load device connected to said firs coil,
whereby upon movement of the vehicle, said mass moves causing said piston to move in said first chamber and impart a charge to said first coil which is stored or used by said energy storage or load device.

22. The arrangement of claim 21, wherein said housing is adapted to be rotatably coupled to and mounted external of a tire of the vehicle, whereby upon rotation of the tire, said mass moves causing said piston to move in said first chamber and impart a charge to said first coil which is stored or used by said energy storage or load device.

23. The arrangement of claim 22, wherein the signal-generating or modifying device is a tire pressure monitor arranged in connection with the tire to monitor the tire.

24. The arrangement of claim 21, wherein said housing further includes a second cylinder defining a second chamber and a second coil wrapped around said second cylinder, said piston rod being movable in said second chamber, said energy storage or load device being connected to said second coil.

25. The arrangement of claim 24, further comprising a second spring compressed by said mass upon movement of said mass in an opposite direction from a direction in which said first spring is compressed by said mass, whereby upon movement of the vehicle, said mass moves causing said piston to alternatingly move in said first and second chambers and impart a charge to said first or second coil which is stored or used by said energy storage or load device.

26. The arrangement of claim 25, wherein said first and second springs are arranged on opposite sides of said mass.

27. The arrangement of claim 21, wherein said first spring is a non-linear spring.

28. A method for providing energy to boost a SAW-based tire pressure monitor, comprising:
mounting the SAW-based tire pressure monitor on each tire of a vehicle; and
coupling a device to the tire pressure monitor on each tire, each device including an antenna, a capacitor and an electronic circuit including a circulator having a first port connected to the antenna to receive a signal from the antenna and a second port connected to the tire pressure monitor to provide a signal to the tire pressure monitor and receive a signal from the tire pressure monitor, the circulator being structured and arranged to receive energy from the capacitor and amplify the signal from the antenna such that the amplified signal is directed to the tire pressure monitor and amplify the signal received from the tire pressure monitor such that a twice-amplified signal is directed to the antenna.

29. The method of claim 28, further comprising:
providing the electronic circuit in each device with a memory containing a unique identification code for the device.

30. The method of claim 28, further comprising arranging the circulator to provide a signal gain of 6 dB at 400 MHz.

31. The method of claim 28, further comprising charging the capacitors during rotation of the tires.

* * * * *

UNITED STATES PATENT AND TRADEMARK OFFICE
CERTIFICATE OF CORRECTION

PATENT NO. : 7,253,725 B2 Page 1 of 1
APPLICATION NO. : 10/642028
DATED : August 7, 2007
INVENTOR(S) : David S. Breed et al.

It is certified that error appears in the above-identified patent and that said Letters Patent is hereby corrected as shown below:

Col. 19, line 54, replace "firs" with --first--.

Signed and Sealed this

Thirtieth Day of October, 2007

JON W. DUDAS
*Director of the United States Patent and Trademark Office*